(12) United States Patent
Güclü et al.

(10) Patent No.: US 11,125,305 B2
(45) Date of Patent: Sep. 21, 2021

(54) TENSIONER

(71) Applicant: GATES CORPORATION, Denver, CO (US)

(72) Inventors: Ahmet Güclü, Izmir (TR); Erman Demir, Izmir (TR); Sarp Cankul, Izmir (TR); Aysu Acar Yilmaz, Izmir (TR); Sevil Ozkent, Izmir (TR)

(73) Assignee: Gates Corporation, Denver, CO (US)

( * ) Notice: Subject to any disclaimer, the term of this patent is extended or adjusted under 35 U.S.C. 154(b) by 281 days.

(21) Appl. No.: 16/447,515

(22) Filed: Jun. 20, 2019

(65) Prior Publication Data
US 2020/0400219 A1 Dec. 24, 2020

(51) Int. Cl.
*F16H 7/12* (2006.01)
*F16H 7/08* (2006.01)

(52) U.S. Cl.
CPC ..... *F16H 7/1281* (2013.01); *F16H 2007/081* (2013.01); *F16H 2007/088* (2013.01); *F16H 2007/0846* (2013.01)

(58) Field of Classification Search
CPC ..... F16H 2007/0878; F16H 2007/0844; F16H 2007/0846; F16H 2007/081; F16H 7/1281
USPC ................. 474/135, 112
See application file for complete search history.

(56) References Cited

U.S. PATENT DOCUMENTS

| | | | |
|---|---|---|---|
| 4,605,387 A * | 8/1986 | Okubo | F16H 7/1281 474/112 |
| 4,832,665 A * | 5/1989 | Kadota | F16H 7/1227 474/112 |
| 4,917,655 A * | 4/1990 | Martin | F16H 7/1218 474/112 |
| 4,923,435 A * | 5/1990 | Kadota | F16H 7/1227 474/112 |
| 4,981,116 A * | 1/1991 | Trinquard | F02B 67/06 123/90.31 |
| 5,244,438 A * | 9/1993 | Golovatai-Schmidt | F01L 1/02 474/112 |
| 5,254,048 A * | 10/1993 | Gardner | F16H 7/1281 474/135 |
| 5,256,113 A * | 10/1993 | Bushman | F02B 67/06 474/135 |
| 5,266,067 A * | 11/1993 | Gapco | F16H 7/1281 474/112 |
| 5,277,667 A * | 1/1994 | Gardner | F16H 7/1281 474/135 |
| 5,480,358 A * | 1/1996 | Sakai | F16H 7/1227 474/117 |
| 5,591,094 A * | 1/1997 | Farmer | F16H 7/1218 474/117 |

(Continued)

*Primary Examiner* — Henry Y Liu

(74) *Attorney, Agent, or Firm* — Alyssa K. Sandrowitz, Esq.

(57) ABSTRACT

A tensioner comprising a base, a shaft extending from the base, a pivot arm pivotally engaged with the shaft, a torsion spring disposed between the pivot arm the base, a base portion cooperatively engagable with a pivot arm portion upon an axial movement of the pivot arm to a first position, a removable member engaged with the shaft to retain the pivot arm in the first position, the first position limiting the pivot arm to a first range of movement, and the pivot arm axially moveable to a second position upon removal of the removable member, the second position limiting the pivot arm to a second range of movement.

15 Claims, 5 Drawing Sheets

(56) References Cited

U.S. PATENT DOCUMENTS

| | | | | |
|---|---|---|---|---|
| 5,702,315 A * | 12/1997 | Sakai | F16H 7/1227 | 474/110 |
| 5,919,107 A * | 7/1999 | Stepniak | F16H 7/1281 | 474/112 |
| 6,083,131 A * | 7/2000 | Katogi | F16H 7/1236 | 474/110 |
| 6,196,940 B1 * | 3/2001 | Lehtovaara | F16H 7/12 | 474/112 |
| 6,364,795 B1 * | 4/2002 | Komorowski | F16H 7/1281 | 474/42 |
| 6,375,588 B1 * | 4/2002 | Frankowski | F16H 7/1227 | 474/101 |
| 6,659,896 B1 * | 12/2003 | Stief | F16H 7/1281 | 474/112 |
| 6,932,731 B2 * | 8/2005 | Kaiser | F16H 7/1218 | 474/112 |
| 7,217,207 B1 * | 5/2007 | Hallen | F16H 7/129 | 474/101 |
| 7,285,065 B2 * | 10/2007 | Dinca | F16H 7/1281 | 474/112 |
| 7,611,431 B2 | 11/2009 | Dinca et al. | | |
| 7,637,829 B2 * | 12/2009 | Stone | F16H 7/1281 | 474/109 |
| 7,874,950 B2 * | 1/2011 | Lehtovaara | F16H 7/1281 | 474/135 |
| 7,918,755 B2 * | 4/2011 | Baumuller | F16H 7/1218 | 474/135 |
| 7,980,976 B2 * | 7/2011 | Stepniak | F16H 7/1281 | 474/112 |
| 8,043,180 B2 * | 10/2011 | Pflug | F16H 7/1281 | 474/135 |
| 8,092,327 B2 * | 1/2012 | Kobara | F16H 7/08 | 474/111 |
| 8,939,857 B2 * | 1/2015 | Doering | B24B 47/10 | 474/112 |
| 9,458,915 B2 * | 10/2016 | Benz | F16H 7/24 | |
| 9,869,379 B2 * | 1/2018 | Frankowski | F16H 7/1218 | |
| 10,323,731 B2 * | 6/2019 | Tronquoy | F16H 7/1218 | |
| 10,520,066 B2 * | 12/2019 | Walter | F16H 7/1218 | |
| 10,570,997 B2 * | 2/2020 | Wang | F16H 7/0831 | |
| 10,753,436 B2 * | 8/2020 | Demir | F16H 7/08 | |
| 2003/0017894 A1 * | 1/2003 | Kaiser | F16H 7/1218 | 474/112 |
| 2003/0216203 A1 * | 11/2003 | Oliver | F16H 7/1281 | 474/134 |
| 2004/0180745 A1 * | 9/2004 | Dinca | F16H 7/1281 | 474/135 |
| 2006/0035740 A1 * | 2/2006 | Lehtovaara | F16D 41/206 | 474/237 |
| 2007/0099736 A1 * | 5/2007 | Hallen | F16H 7/129 | 474/101 |
| 2007/0099737 A1 * | 5/2007 | Hallen | F16H 7/129 | 474/101 |
| 2008/0153642 A1 * | 6/2008 | Baumuller | F16H 7/1281 | 474/101 |
| 2008/0293527 A1 * | 11/2008 | D'Amicantonio | F16H 7/1218 | 474/135 |
| 2009/0011881 A1 * | 1/2009 | Lehtovaara | F16H 7/1281 | 474/135 |
| 2009/0111629 A1 * | 4/2009 | Kobara | F02B 67/06 | 474/111 |
| 2014/0315673 A1 * | 10/2014 | Zacker | F16H 7/1218 | 474/135 |
| 2015/0011345 A1 * | 1/2015 | Lescorail | F16H 7/1281 | 474/136 |
| 2015/0247558 A1 * | 9/2015 | Hamers | F16H 7/1218 | 474/117 |
| 2015/0369346 A1 * | 12/2015 | Sisodia | F16H 7/14 | 474/135 |
| 2015/0369347 A1 * | 12/2015 | Wolf | F16H 7/1281 | 474/134 |
| 2016/0215859 A1 * | 7/2016 | Frankowski | F16H 7/0831 | |
| 2017/0184183 A1 * | 6/2017 | Noro | F16H 7/08 | |
| 2017/0219068 A1 * | 8/2017 | Tronquoy | F16H 7/1281 | |
| 2018/0010670 A1 * | 1/2018 | Leucht | F16H 7/0831 | |
| 2018/0156317 A1 * | 6/2018 | Maricic | F16H 7/1218 | |

* cited by examiner

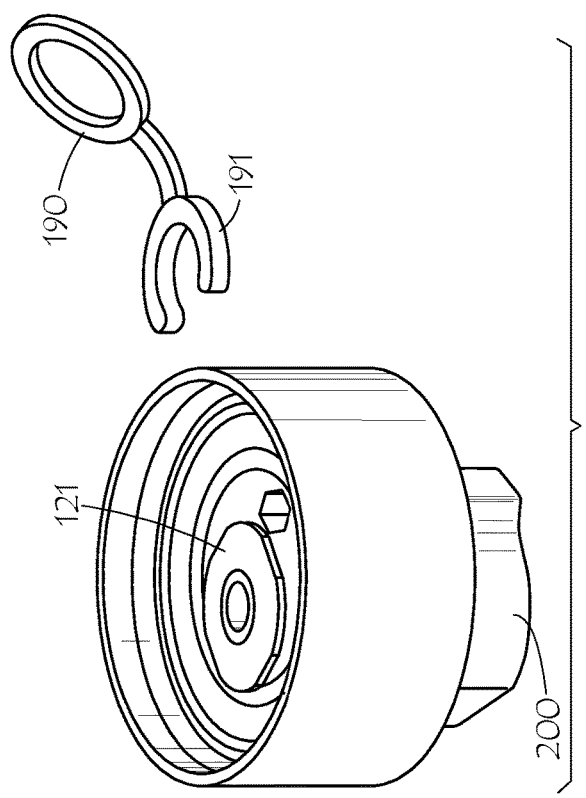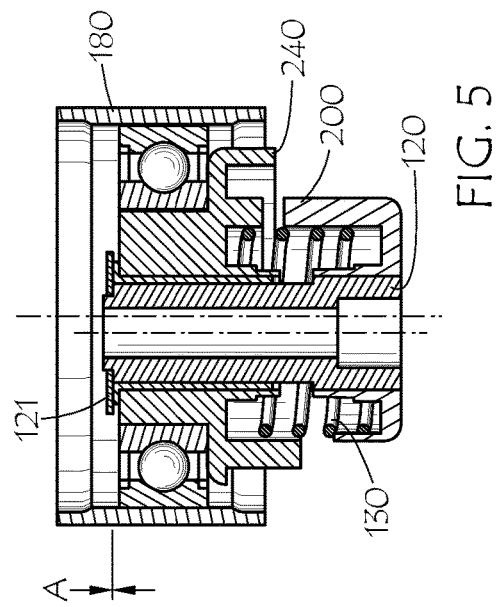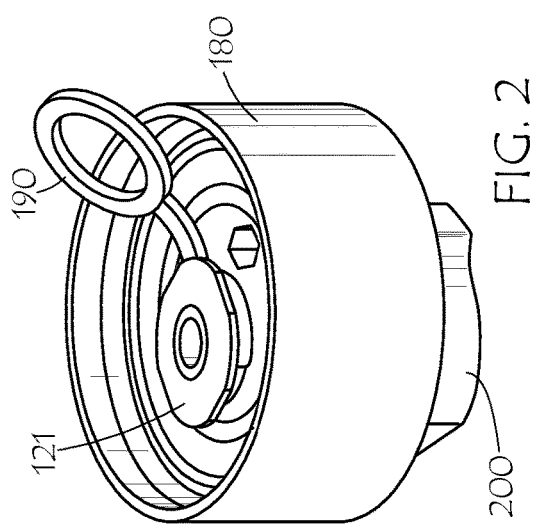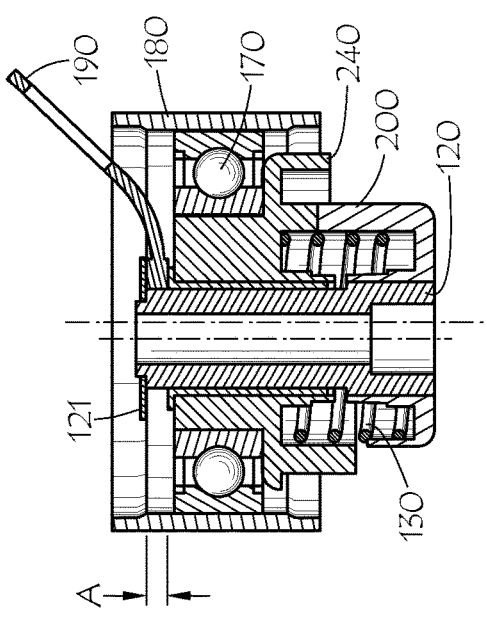

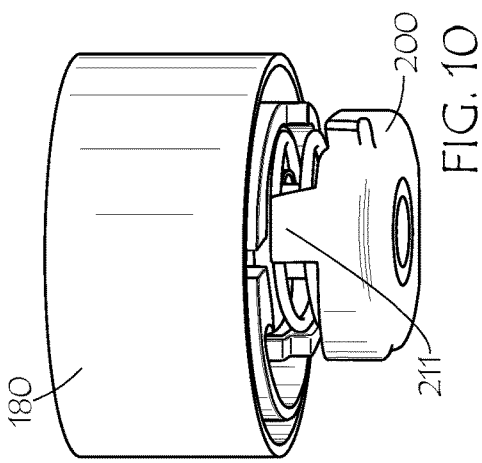
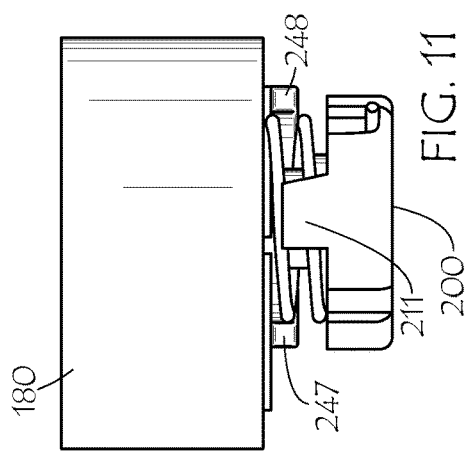
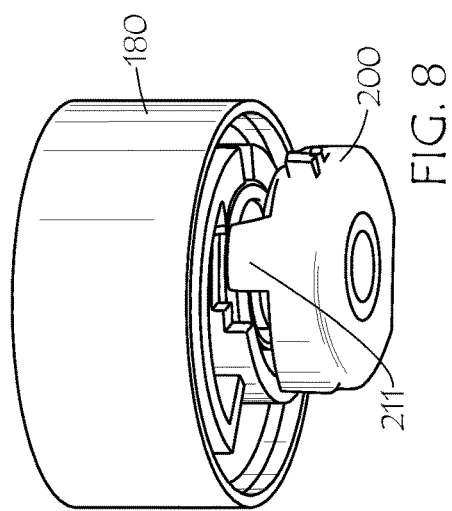
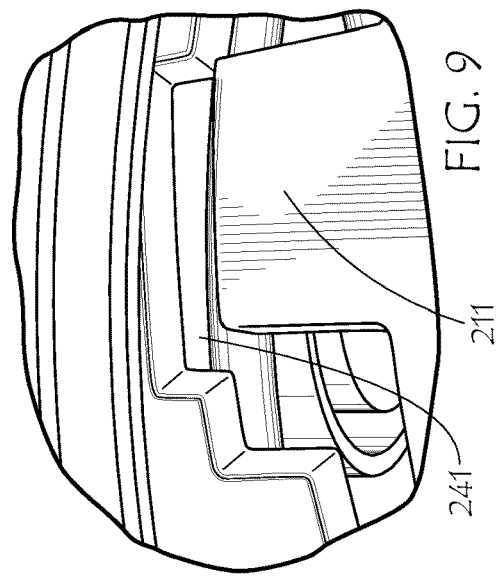
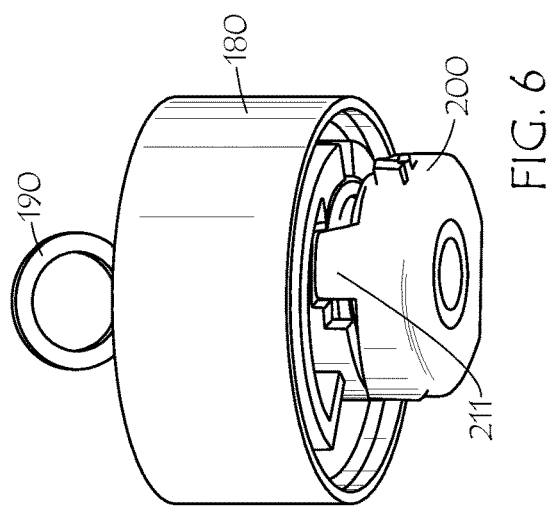
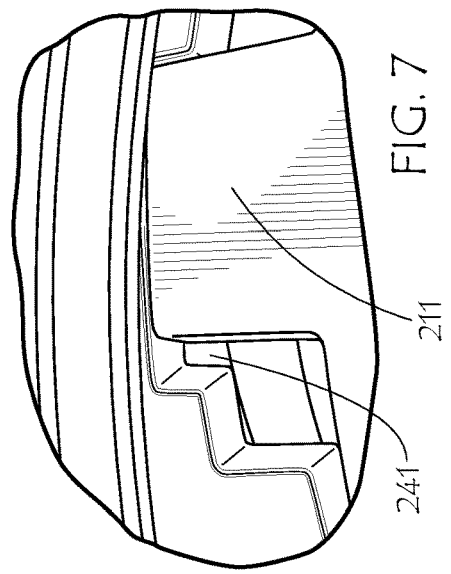

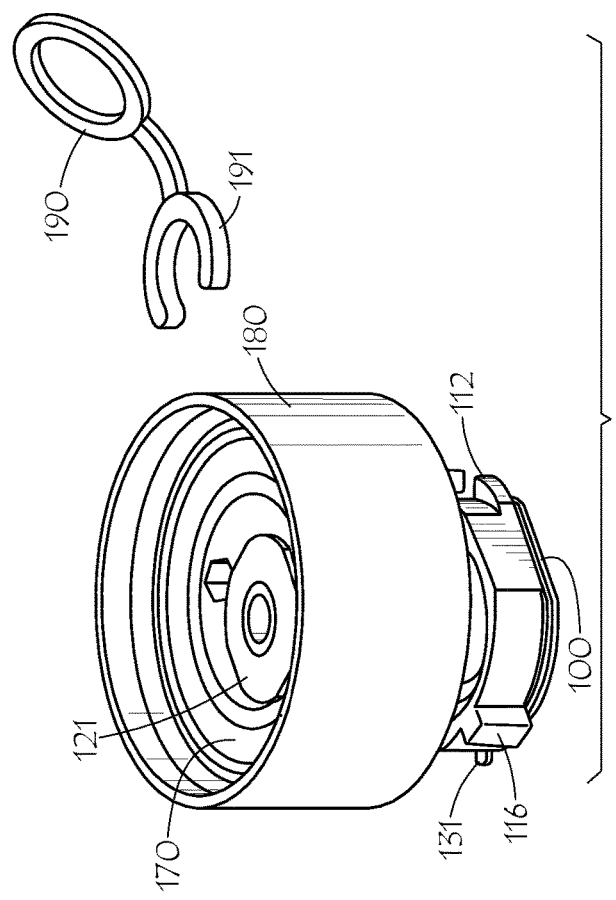
FIG. 12
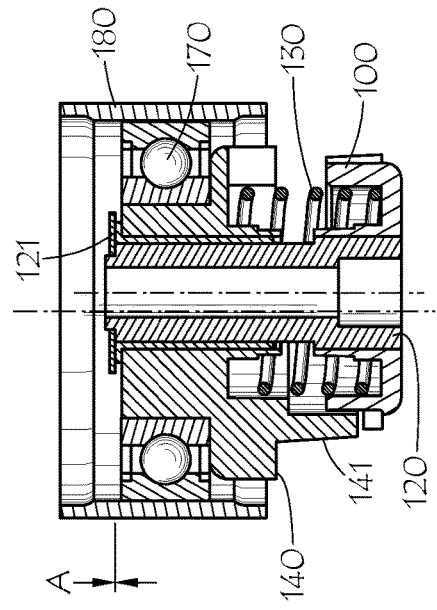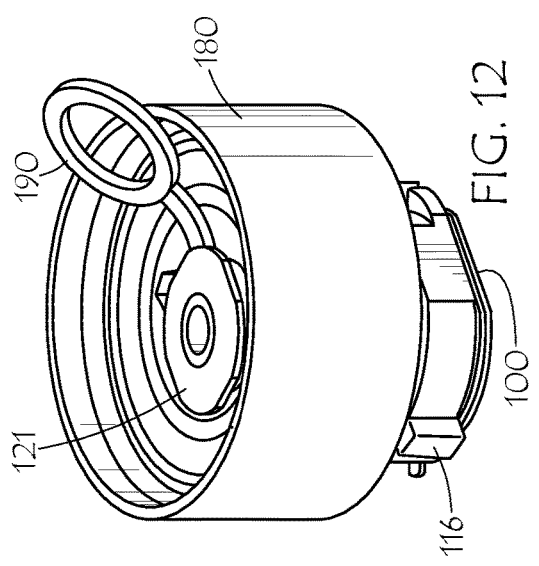
FIG. 14
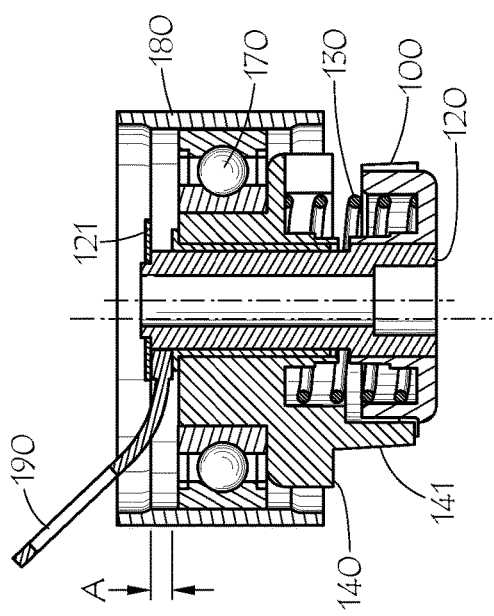
FIG. 13
FIG. 15

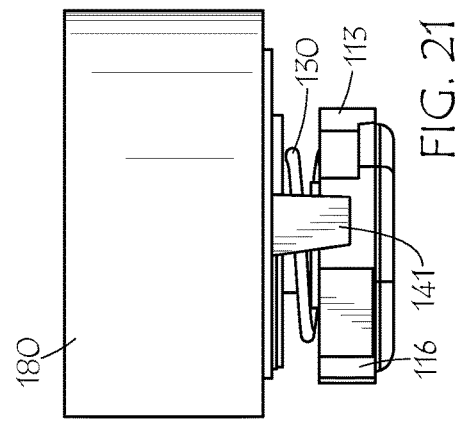
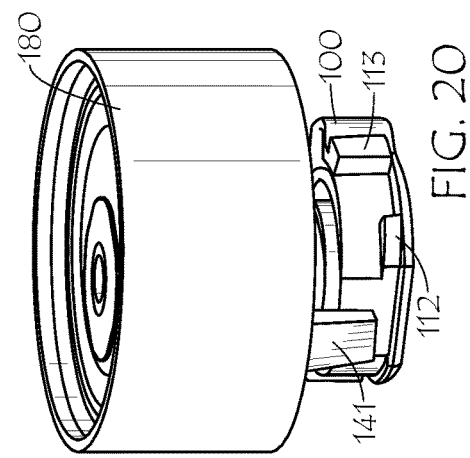
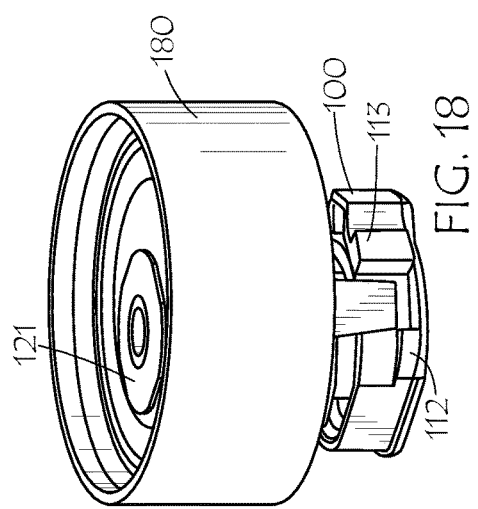
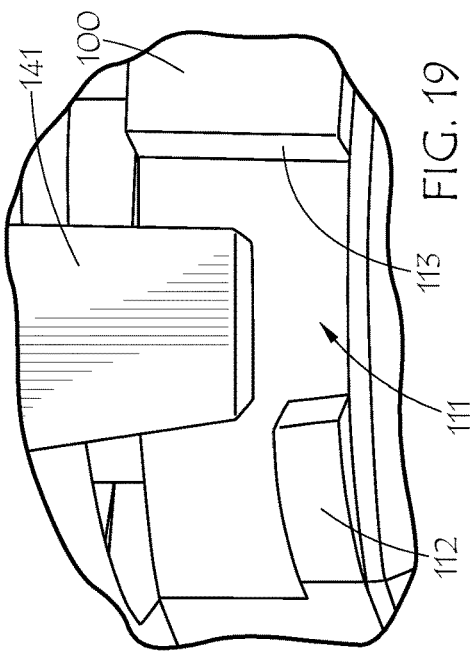
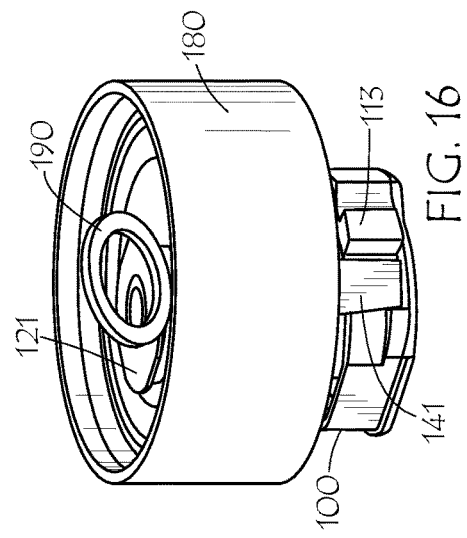
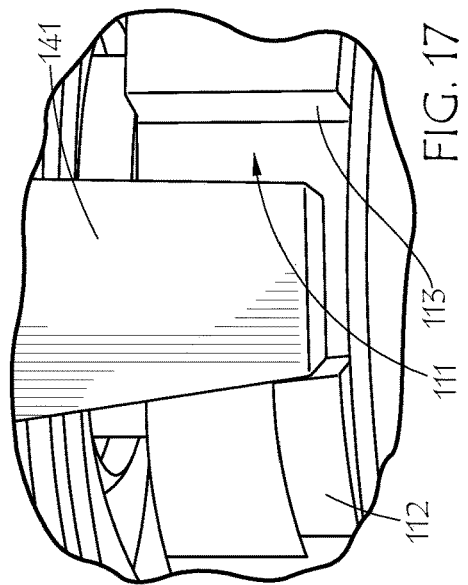

TENSIONER

FIELD OF THE INVENTION

The invention relates to a tensioner, and more particularly, to a tensioner having a removable member engaged with the shaft to retain the pivot arm in the first position, the first position limiting the pivot arm to a first range of movement, and the pivot arm axially moveable to a second position upon removal of the removable member, the second position limiting the pivot arm to a second range of movement.

BACKGROUND OF THE INVENTION

Belt tensioners are generally well known devices that have been used previously in many belt-drive systems. It is conventional practice to use a tensioner to apply a constant belt-tensioning force, which compensates for increases in belt length due to wear and other factors. A common type of conventional belt tensioner has a fixed structure and a pivoted structure eccentrically mounted on the fixed structure by means of a pivot assembly, and the pivoted structure has a belt-engaging pulley rotationally mounted on it. A coil spring surrounds the pivot assembly and has its ends connected between the fixed and pivoted structures so as to bias the pivot structure in a belt take-up direction. As the pivoted structure moves from a position of minimum belt take-up to a position of maximum belt take-up, the spring biasing force decreases. Despite this varying spring force over the range of tensioner movement, substantially constant belt tension is maintained by the tensioner.

Various techniques are currently used to properly install timing belt tensioners on engines. One of the most commonly used techniques is to construct the tensioner with an eccentric adjusting member that forms part of the fixed structure; the eccentric adjusting member is rotated around the tensioner mounting bolt and thus moves the tensioner away from the belt (to allow the belt to be routed into the drive system) or towards the belt (to apply tension in the drive system). A typical installation procedure when using the current standard design includes mounting the tensioner on the engine with the eccentric member in the extreme position away from the belt, routing the belt into the drive system, rotating the eccentric member towards the belt until the tensioner reaches the nominal operating position, and locking the tensioner with the mounting bolt.

Representative of the art is U.S. Pat. No. 7,980,976 which discloses a tensioner for tensioning a flexible drive means, such as a timing belt or chain, includes a pulley to contact the belt. The pulley is mounted on a tensioner arm and the tensioner arm can be rotated about a pivot shaft mounted to the tensioner by a spring. The axis about which the pulley rotates is spaced from the axis of the rotation of the tensioner arm with respect to the pivot shaft and the spacing of these axes of rotation results in the pulley moving through an eccentric towards or away from the belt when the tensioner arm is rotated. A stop is used to limit the range of movement of the tensioner arm between a desired range of movement defined by a free arm stop and a backstop. The position of the stop is adjustable by an installer. The angular range of movement of the tensioner arm is adjustable from a position suitable for installation of the tensioner to a position suitable for operation of the installed tensioner. In one embodiment, the movement of the stop from the installation position to the nominal operating position also compensates the spring.

What is needed is a tensioner having a removable member engaged with the shaft to retain the pivot arm in the first position, the first position limiting the pivot arm to a first range of movement, and the pivot arm axially moveable to a second position upon removal of the removable member, the second position limiting the pivot arm to a second range of movement. The invention meets this need.

SUMMARY OF THE INVENTION

The primary aspect of the invention is to provide a tensioner having a removable member engaged with the shaft to retain the pivot arm in the first position, the first position limiting the pivot arm to a first range of movement, and the pivot arm axially moveable to a second position upon removal of the removable member, the second position limiting the pivot arm to a second range of movement.

Other aspects of the invention will be pointed out or made obvious by the following description of the invention and the accompanying drawings.

The invention is a tensioner comprising a base, a shaft extending from the base, a pivot arm pivotally engaged with the shaft, a torsion spring disposed between the pivot arm the base, a base portion cooperatively engagable with a pivot arm portion upon an axial movement of the pivot arm to a first position, a removable member engaged with the shaft to retain the pivot arm in the first position, the first position limiting the pivot arm to a first range of movement, and the pivot arm axially moveable to a second position upon removal of the removable member, the second position limiting the pivot arm to a second range of movement.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

The accompanying drawings, which are incorporated in and form a part of the specification, illustrate preferred embodiments of the present invention, and together with a description, serve to explain the principles of the invention.

FIG. 2 is a top perspective view.
FIG. 3 is a cross section view.
FIG. 4 is a top perspective view.
FIG. 5 is a cross section view.
FIG. 6 is a bottom perspective view.
FIG. 7 is a detail of FIG. 6.
FIG. 8 is a bottom perspective view.
FIG. 9 is a detail of FIG. 8.

FIG. 10 is a bottom perspective view.
FIG. 11 is a side view.
FIG. 12 is a top perspective view.
FIG. 13 is a cross section view.
FIG. 14 is a top perspective view.
FIG. 15 is a cross section view.
FIG. 16 is a top perspective view.
FIG. 17 is a detail of FIG. 16.
FIG. 18 is a top perspective view.
FIG. 19 is a detail of FIG. 18.
FIG. 20 is a top perspective view.
FIG. 21 is a side view.

Figure 1:
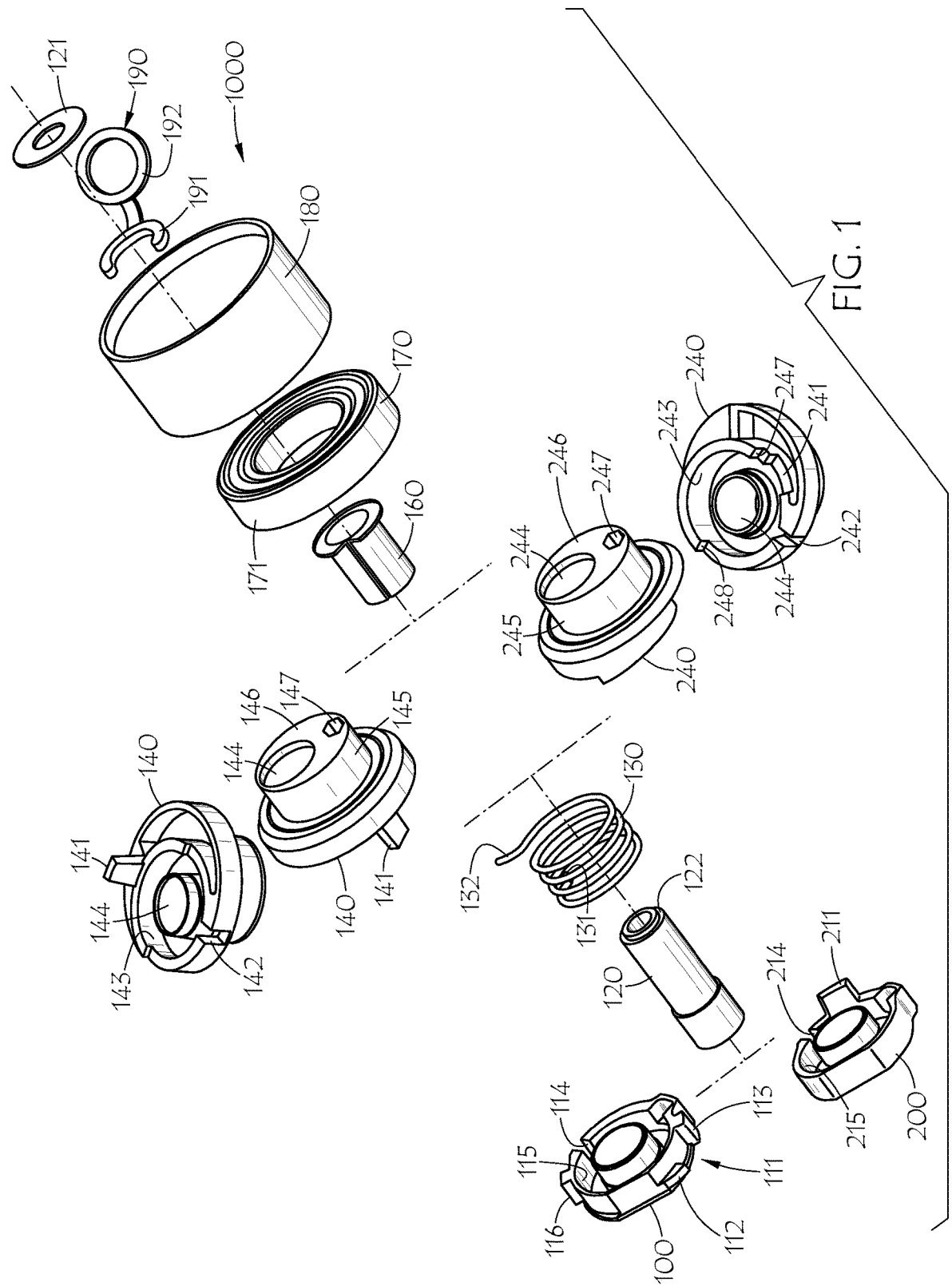
FIG. 1 is an exploded view.

DETAILED DESCRIPTION OF THE
PREFERRED EMBODIMENT

FIG. 1 is an exploded view. FIG. 1 shows two embodiments of the tensioner.

In a first embodiment tensioner 1000 comprises a base 100. Shaft 120 is engaged with and axially projects from base 100. Pivot arm 140 pivots about shaft 120 on bushing 160. Torsion spring 130 is engaged between base 100 and pivot arm 140. Bearing 170 is engaged with pivot arm 140. Pulley 180 is journalled to pivot arm 140 with bearing 170. Retainer 121 engages a groove 122 on shaft 120. Retainer 121 can comprise a snap ring, washer, cotter pin or any other suitable flanged fastener.

Base 100 comprises a receiving portion 111. Receiving portion 11 cooperatively receives projection 141. Projection 141 projects axially from pivot arm 140. Projection 141 moves between stop 112 and stop 113.

Portion 114 receives end 131 of spring 130. Spring 130 is received in base annulus 115.

End 132 of spring 130 is received in portion 142. Spring 130 is received in pivot arm annulus 130. Shaft 120 projects through hole 144.

Bushing 160 is disposed between shaft 120 and pivot arm 140. Bushing 160 facilitates pivotal movement of pivot arm 140. Bearing 170 is pressed on outer surface 145.

Pulley 180 is pressed on outer surface 171 of bearing 170. Retainer 121 snaps into groove 122 to retain pivot arm 140 and spring 130 on shaft 120.

Removable clip 190 engages between surface 146 of pivot arm 140 and retainer 121. Removable clip 190 comprises arcuate portion 191 and handle 192. Arcuate portion 191 comprises an angular extent which is greater than 180° so that portion 191 can grip shaft 120, thereby holding portion 191 in place. Tool receiver 147 can be used to attach a tool for rotating the pivot arm.

In an alternate embodiment base 200 replaces base 100. Pivot arm 240 replaces pivot arm 140. Base 200 comprises an axial projection 211. Receiving portion 241 of pivot arm 240 receives projection 211. Portion 214 receives an end 131 of spring 130. Base annulus 215 receives spring 130. Tool receiver 247 can be used to attach a tool for rotating the pivot arm.

Pivot arm annulus 243 receives spring 130. Portion 242 receives an end 132 of spring 130.

End 241a and end 241b of receiving portion 241 limit pivotal movement of pivot arm 240 by engagement with projection 211.

Removable clip 190 engages between surface 246 of pivot arm 240 and retainer 121.

FIG. 2 is a top perspective view. The alternate embodiment is shown in the installation configuration with the removable clip 190 installed. Clip 190 depresses pivot arm 240 toward base 200 thereby partially compressing spring 130 which generates a spring force.

FIG. 3 is a cross section view. Pivot arm 240 is depressed by a dimension "A". Dimension "A" is the thickness of portion 191. In the installation configuration projection 211 engages receiving portion 241. This has the effect of locking pivot arm 240 in place relative to the base. This is referred to as the installation configuration.

FIG. 4 is a top perspective view. To complete installation to the installed configuration removable clip 190 is manually removed by an installer. This causes pivot arm 240 to move away from base 200 into engagement with retainer 121.

FIG. 5 is a cross section view. Movement of pivot arm 240 closes dimension "A" and disengages projection 211 from receiving portion 241. This allows pivot arm 240 to pivot through its fully operational range of movement.

FIG. 6 is a bottom perspective view. The embodiment is shown in the installation configuration with removable clip 190 still in place.

FIG. 7 is a detail of FIG. 6. Projection 211 is engaged with receiving portion 241.

FIG. 8 is a bottom perspective view. Clip 190 has been removed. Pivot arm 240 has moved away from base 200.

FIG. 9 is a detail of FIG. 8. Projection 211 no longer engages receiving portion 241. Pivot arm 240 is free to rotate about shaft 120. This is the operational configuration.

FIG. 10 is a bottom perspective view. Pivot arm 240 has rotated from the position shown in FIG. 8 into the mean operating position.

FIG. 11 is a side view. Projection 211 limits movement of pivot arm 240 between stop 247 and stop 248. Stop 247 and stop 248 define the operational range of movement of pivot arm 240.

FIG. 12 is a top perspective view. The embodiment is shown in the installation configuration with the removable clip 190 installed. Clip 190 depresses pivot arm 140 toward base 100 thereby partially compressing spring 130 which generates a spring force.

FIG. 13 is a cross section view. Pivot arm 140 is depressed by a dimension "A". Dimension "A" is the thickness of portion 191. In the installation configuration projection 141 engages receiving portion 111. Receiving portion 111 is defined between stop 112 and stop 113. This has the effect of locking pivot arm 140 in place relative to the base. This is referred to as the installation configuration.

FIG. 14 is a top perspective view. To complete installation to the installed configuration removable clip 190 is manually removed by an installer. This causes pivot arm 140 to move away from base 100 into engagement with retainer 121.

FIG. 15 is a cross section view. Movement of pivot arm 140 closes dimension "A" and disengages projection 141 from receiving portion 111. This allows pivot arm 140 to pivot through its fully operational range of movement.

FIG. 16 is a top perspective view. The embodiment is shown in the installation configuration with removable clip 190 still in place.

FIG. 17 is a detail of FIG. 16. Projection 141 is engaged with receiving portion 111.

FIG. 18 is a top perspective view. Clip 190 has been removed. Pivot arm 140 has moved away from base 100.

FIG. 19 is a detail of FIG. 18. Projection 141 no longer engages receiving portion 111. Pivot arm 140 is free to rotate about shaft 120. This is referred to as the operational configuration.

FIG. 20 is a top perspective view. Pivot arm 140 has rotated from the position shown in FIG. 18 into the mean operating position.

FIG. 21 is a side view. Projection 141 limits movement of pivot arm 140 between stop 113 and stop 116. Stop 113 and stop 116 define the operational range of movement of pivot arm 140. The mean operating position falls within the operational range.

Although forms of the invention have been described herein, it will be obvious to those skilled in the art that variations may be made in the construction and relation of parts without departing from the spirit and scope of the invention described herein. Unless otherwise specifically noted, components depicted in the drawings are not drawn to scale. Further, it is not intended that any of the appended claims or claim elements invoke 35 U.S.C. § 112(f) unless the words "means for" or "step for" are explicitly used in the particular claim. The present disclosure should in no way be limited to the exemplary embodiments or numerical dimensions illustrated in the drawings and described herein.

We claim:

1. A tensioner comprising:
   a base;
   a shaft extending from the base;
   a pivot arm pivotally engaged with the shaft;
   a torsion spring disposed between the pivot arm the base;
   a base portion cooperatively engagable with a pivot arm portion upon an axial movement of the pivot arm to a first position;
   a removable member engaged with the shaft to retain the pivot arm in the first position, the first position limiting the pivot arm to a first range of movement; and
   the pivot arm axially moveable to a second position upon removal of the removable member, the second position limiting the pivot arm to a second range of movement.

2. The tensioner as in claim 1, wherein the torsion spring is in partial compression in the first position.

3. The tensioner as in claim 1, wherein the removable member comprises an arcuate portion engagable with the shaft, the arcuate portion extending through an angular extent greater than 180°.

4. The tensioner as in claim 1, wherein the removable member is disposed between the pivot arm and a retainer fixed to the shaft.

5. The tensioner as in claim 1, wherein:
   the base portion comprises a receiving portion;
   the pivot arm portion comprises a projecting portion for cooperatively engaging the receiving portion.

6. The tensioner as in claim 1, wherein:
   the pivot arm portion comprises a receiving portion;
   the base portion comprises a projecting portion for cooperatively engaging the receiving portion.

7. The tensioner as in claim 1, wherein the second range of movement is greater than the first range of movement.

8. A tensioner comprising:
   a base;
   a shaft extending from the base, a retainer fixed to an end of the shaft;
   a pivot arm pivotally engaged with the shaft;
   a torsion spring disposed between the pivot arm the base;
   a base portion cooperatively engagable with a pivot arm portion upon an axial movement of the pivot arm to a first position;
   a removable member engaged between the retainer and the pivot arm to retain the pivot arm in the first position, the first position limiting the pivot arm to a first range of movement;
   the pivot arm axially moveable to a second position upon removal of the removable member, the second position limiting the pivot arm to a second range of movement; and
   the second position determined by engagement of the pivot arm with the retainer.

9. The tensioner as in claim 8, wherein the removable member comprises an arcuate portion engagable with the shaft, the arcuate portion extending through an angular extent greater than 180°.

10. The tensioner as in claim 8, wherein:
    the base portion comprises a receiving portion;
    the pivot arm portion comprises a projecting portion for cooperatively engaging the receiving portion.

11. The tensioner as in claim 8, wherein:
    the pivot arm portion comprises a receiving portion;
    the base portion comprises a projecting portion for cooperatively engaging the receiving portion.

12. The tensioner as in claim 8, wherein the second range of movement is greater than the first range of movement.

13. A tensioner comprising:
    a base;
    a shaft extending from the base, a retainer fixed to an end of the shaft;
    a pivot arm pivotally engaged with the shaft;
    a torsion spring disposed between the pivot arm the base;
    a base portion cooperatively engagable with a pivot arm portion upon an axial movement of the pivot arm to a first position;
    a removable member engaged between the retainer and the pivot arm to retain the pivot arm in the first position, the first position limiting the pivot arm to a first range of movement;
    the pivot arm axially moveable to a second position upon removal of the removable member, the second position limiting the pivot arm to a second range of movement that is greater than the first range of movement; and
    the second position determined by engagement of the pivot arm with the retainer.

14. The tensioner as in claim 13, wherein:
    the base portion comprises a receiving portion;
    the pivot arm portion comprises a projecting portion for cooperatively engaging the receiving portion.

15. The tensioner as in claim 13, wherein:
    the pivot arm portion comprises a receiving portion;
    the base portion comprises a projecting portion for cooperatively engaging the receiving portion.

* * * * *